(12) United States Patent
Suzuki et al.

(10) Patent No.: US 8,770,944 B2
(45) Date of Patent: Jul. 8, 2014

(54) TURBINE AIRFOIL COMPONENT AND METHOD FOR MAKING

(75) Inventors: Akane Suzuki, Clifton Park, NY (US); Stephen Francis Rutkowski, Duanesburg, NY (US); Michale Francis Xavier Gigliotti, Jr., Glenville, NY (US)

(73) Assignee: General Electric Company, Niskayuna, NY (US)

( * ) Notice: Subject to any disclaimer, the term of this patent is extended or adjusted under 35 U.S.C. 154(b) by 644 days.

(21) Appl. No.: 13/077,475

(22) Filed: Mar. 31, 2011

(65) Prior Publication Data

US 2012/0251330 A1  Oct. 4, 2012

(51) Int. Cl.
 *F01D 5/14* (2006.01)
 *B22D 25/00* (2006.01)
 *B22D 27/04* (2006.01)

(52) U.S. Cl.
USPC ............ 416/241 R; 416/223 R; 29/889.7; 164/122.2

(58) Field of Classification Search
USPC .......... 416/241 R, 223 R, 239, 223 A, 226; 29/889.7, 527.4; 164/122.1, 122.2, 128
See application file for complete search history.

(56) References Cited

U.S. PATENT DOCUMENTS

| | | | |
|---|---|---|---|
| 3,844,728 A * | 10/1974 | Copley et al. ............... | 416/225 |
| 4,637,448 A | 1/1987 | Burke et al. | |
| 4,813,470 A | 3/1989 | Chiang | |
| 6,217,286 B1 * | 4/2001 | Huang et al. ............. | 416/241 R |
| 7,152,659 B2 | 12/2006 | Boswell | |
| 7,204,294 B2 | 4/2007 | Jennings et al. | |
| 7,575,038 B2 | 8/2009 | Schaadt et al. | |
| 7,690,112 B2 | 4/2010 | Bostanjoglo et al. | |
| 7,762,309 B2 | 7/2010 | Tamaddoni-Jahromi et al. | |
| 7,779,890 B2 | 8/2010 | Frasier et al. | |
| 2009/0078390 A1 * | 3/2009 | Tamaddoni-Jahromi et al. ........... | 164/122.2 |

OTHER PUBLICATIONS

Versnyder et al., "The Development of Columnar Grain and Single Crystal High Temperature Materials Through Directional Solidification", Materials Science and Engineering, vol. 6, Issue 4, pp. 213-247, Oct. 1970.

Harris et al., "Development of Two Rhenium-Containing Superalloys for Single-Crystal Blade and Directionally Solidified Vane Applications in Advanced Turbine Engines", Journal of Materials Engineering and Performance, vol. 2, Issue 4, pp. 481-487, Aug. 1993.

* cited by examiner

*Primary Examiner* — Nathaniel Wiehe
*Assistant Examiner* — Aaron Jagoda
(74) *Attorney, Agent, or Firm* — Paul J. DiConza

(57) ABSTRACT

A component such as a turbine bucket or blade, and method for making the component, are presented. One embodiment is an article that comprises an airfoil casting portion comprising a plurality of integral regions, wherein the plurality of integral regions comprises a single-crystalline region and a columnar-grained region. Another embodiment is a method for fabricating an article. The method comprises providing a quantity of molten metal; providing a mold defining an airfoil portion having an axial direction and a transverse direction, wherein the airfoil portion of the mold comprises a single-crystal growth region and a columnar growth region disposed along the transverse direction from the single crystal growth region; introducing the molten metal into the mold; and solidifying the metal such that a solidification front progresses in the axial direction to produce an airfoil casting portion comprising a single-crystalline region and a columnar-grained region.

22 Claims, 2 Drawing Sheets

TURBINE AIRFOIL COMPONENT AND METHOD FOR MAKING

BACKGROUND

This invention relates to high-temperature machine components. More particularly, this invention relates to methods for manufacture of components for gas turbine engines, and the articles made from the use of these methods.

In a gas turbine engine, compressed air is mixed with fuel in a combustor and ignited, generating a flow of hot combustion gases through one or more turbine stages that extract energy from the gas, producing output power. Each turbine stage includes a stator nozzle (also known as "vane") having airfoils that direct the combustion gases against a corresponding row of turbine blades (also called "buckets"), each having an airfoil extending from a blade base (also called "platform"), where a joint attaches the blade to a supporting rotor disk, to a blade tip at the opposite end. The turbine airfoils are subject to substantial heat load, and, because the efficiency of a gas turbine engine is proportional to gas temperature, the continuous demand for efficiency improvements translates to a demand for turbine airfoil components (herein referred to collectively as "turbine airfoils) such as nozzles and blades that are capable of withstanding higher temperatures for longer service times.

Turbine airfoils made of single-crystal materials or directionally solidified, columnar-grained materials have been developed to better cope with the rigors of high service temperatures. Although single-crystal components generally exhibit better high-temperature capability relative to directionally solidified components, the processes used to cast single-crystal materials are typically more expensive than directional solidification processes for large components. Moreover, the very high capability of single-crystal material may not be required at all locations of the airfoil component. For example, leading and trailing edges of a turbine blade are often subject to significantly higher temperatures in service than other regions of the blade. Nevertheless, conventional single-crystal casting processes produce components made entirely of single crystal material, even for regions of components that may not require the costly but high-performing material.

Therefore, there remains a need in the art for economical fabrication processes capable of producing turbine airfoil components with structure and properties tailored for stringent service requirements. There is also a need for cost-effective components that meet such requirements.

BRIEF DESCRIPTION

Embodiments of the present invention are provided to meet these and other needs. One embodiment is an article that comprises an airfoil casting portion comprising a plurality of integral regions, wherein the plurality of integral regions comprises a single-crystalline region and a columnar-grained region.

Another embodiment is an article. The article comprises an airfoil casting portion comprising a base section, a tip section opposite the base section in an axial direction along the airfoil casting portion, a leading edge section, and a trailing edge section opposite the leading edge section in a transverse direction along the airfoil casting portion. The article further comprises a shroud portion comprising columnar-grained material, the shroud portion disposed at the tip section and integral with the airfoil casting portion; and a platform portion comprising columnar-grained material, the platform section disposed at the base section and integral with the airfoil casting portion. The airfoil casting portion further comprises a single-crystalline region disposed at the leading edge section, or at the trailing edge section, or at both the leading edge section and the trailing edge section; and a columnar-grained region. Moreover, at least 10 percent of a solid cross-sectional area of airfoil casting portion, as measured at a midpoint between a base and a tip of the airfoil, comprises single-crystalline material.

Another embodiment is a method for fabricating an article. The method comprises providing a quantity of molten metal; providing a mold defining an airfoil portion having an axial direction and a transverse direction, wherein the airfoil portion of the mold comprises a single-crystal growth region and a columnar growth region disposed along the transverse direction from the single crystal growth region; introducing the molten metal into the mold; and solidifying the metal such that a solidification front progresses in the axial direction to produce an airfoil casting portion comprising a single-crystalline region and a columnar-grained region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
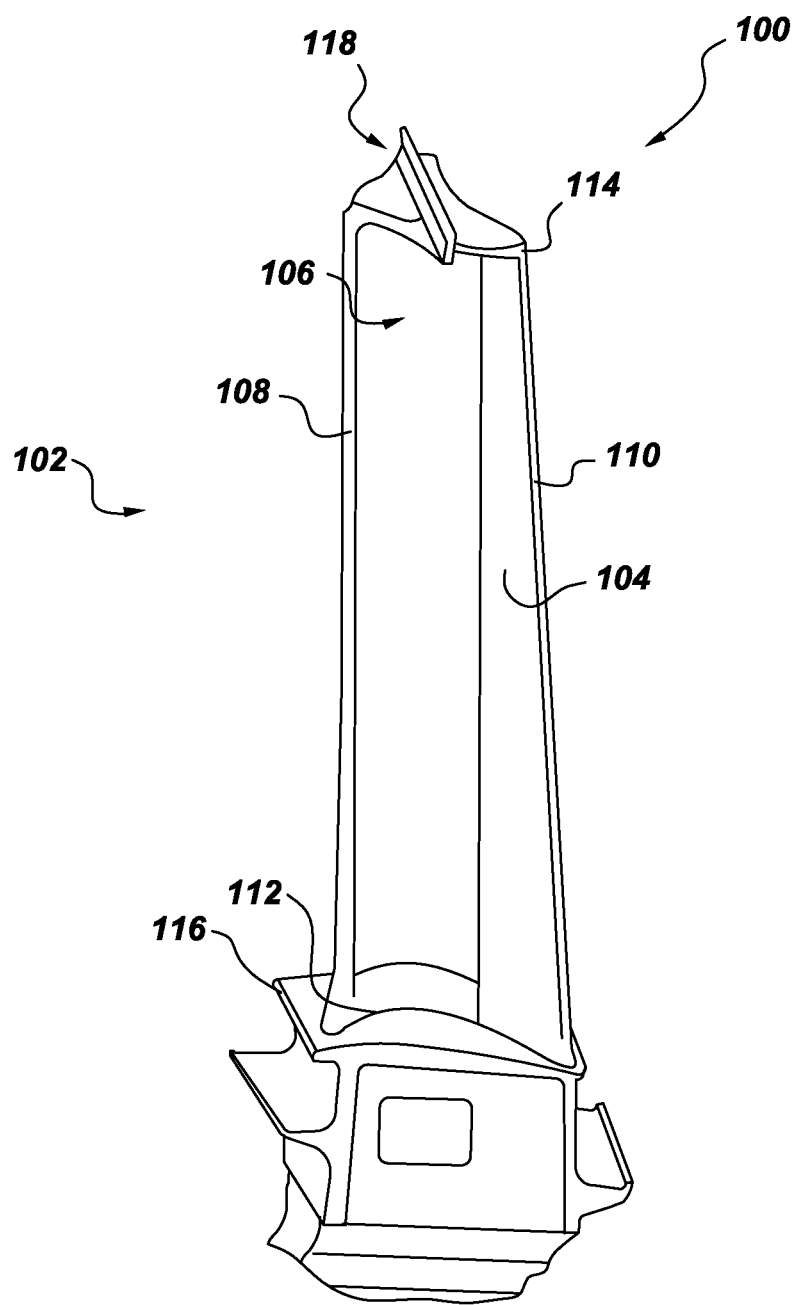
FIG. 1 is a schematic side view of an article according to an embodiment of the present invention.

Turbines typically have more than one row ("stage") of buckets to extract energy from the hot gas. As the gas passes through successive rows of buckets, the gas expands to a larger volume, and the gas temperature is reduced. The buckets in each row are typically thinner and longer than the buckets in the preceding stage, making internal air-cooling of thin leading and trailing edges more difficult. The buckets in the rows some distance away from the combustor are sometimes termed "latter-stage buckets."

The performance of a gas turbine airfoil component is often limited by its properties in a specific location. For example, in many airfoil designs, parts are cooled via internal channels through which air is passed, but the leading and trailing edges of some airfoil designs, such as latter-stage bucket airfoils, is too thin to readily accommodate complex internal cooling channels. The resultant lack of cooling creates a region that experiences high service temperatures compared to the rest of the airfoil. In many cases the component is made of columnar-grained, directionally solidified material, because such material is satisfactory for the majority of the component. However, aggressive local conditions, for example, at the trailing edge, may limit the overall effective lifetime of the part, because degradation of the material may likely be most severe in this area. Other potential lifetime-limiting locations on turbine airfoil components include the airfoil leading edge, for example. The location and nature of these "hot spots" on the components depends in part on the stage of the turbine where the component is located, the design of the component, and the operating conditions of the turbine assembly.

The application of single-crystal material may increase the useful lifetime of such life-limited components. However, making the entire part from higher-performing single-crystal material may be unsustainably costly for some applications, because the expense of producing an entire component of single-crystal material may far outweigh the added performance benefit attributable to having single-crystal material at the location of concern.

Certain embodiments of the present invention provide articles that include, in a single casting, an airfoil casting portion made of multiple regions, where a region is defined as a portion of the airfoil casting that is made of a single material type. Examples of material types include single-crystalline material, columnar-grained material, and polycrystalline material that is not columnar (such as equiaxed material). As used herein, "single-crystalline material" and "single-crystal material" are deemed equivalent and mean a crystalline material that is free of grain boundaries and is sized to make up a significant fraction of the airfoil casting portion, such as, in some embodiments, at least about 10% of the solid cross-sectional area of the airfoil casting portion. The term "columnar-grained material" means a polycrystalline material in which the grains have aspect ratios greater than 1, with the long axes of the grains substantially parallel to one another, in keeping with how that term is understood in the art of metallurgical processing.

FIG. 1 illustrates an example of an embodiment of the present invention. An article 100 includes an airfoil casting portion 102 that includes a plurality of integral regions, including a single-crystalline region 104 and a polycrystalline region 106. In some embodiments, airfoil 102 further comprises one or more internal air-cooling channels (not shown) in accordance with methods and structures known in the art. Airfoil casting portion may be any metal suitable to meet specific service requirements, and in certain embodiments comprises a nickel alloy, a cobalt alloy, or a nickel-iron alloy; particular examples include nickel-based superalloys commonly used in the art to fabricate components for gas turbines. In some embodiments, polycrystalline region 106 is a columnar-grained region (also denoted in FIG. 1 by element number 106), meaning that the polycrystalline material contained within region 106 is columnar-grained material. Regions 104, 106 are integral regions, meaning that they are all part of a single casting, that is, the airfoil casting portion 102, and are not joined to airfoil casting portion 102 in a separate joining step.

Airfoil casting portion 102 may be characterized as having a leading edge section 108, disposed to face into flow of gas during turbine operation, and a trailing edge section 110 disposed to include the rearmost edge of the airfoil. Airfoil casting portion 102 is described herein to extend "axially" (that is, in an "axial" direction) from a base section 112 to a tip section 114, and "transversely (in a "transverse" direction) from leading edge 108 to trailing edge 110. In some embodiments, as shown in FIG. 1, regions 104 and 106 are in intimate contact and disposed transversely relative to one another. In some embodiments, regions 104 and 106 are next to each other, but one region does not enclose or surround another region; such an arrangement is referred to herein as a "side-by-side relationship."

In some embodiments a platform portion 116 adjoins airfoil casting portion 102 at base section 112. Platform portion 116 may be integral with airfoil casting portion 102 or may be metallurgically joined (as via welding or brazing, for instance), mechanically joined (via mechanical fasteners, for example), or otherwise attached to airfoil casting portion 102. In one embodiment, platform region 116 comprises columnar-grained material. The local operating conditions experienced by platform 116 may not be as demanding as those experienced by other sections of article 102, and thus columnar-grained material may be sufficient to provide acceptable performance without the need for more costly single-crystal material.

In certain embodiments, other components may be attached to airfoil casting portion 102, such as a shroud portion 118 attached at tip section 114. Shroud portion 118 also may be integral with airfoil casting portion 102 or may be metallurgically joined (as via welding or brazing, for instance), mechanically joined (via mechanical fasteners, for example), or otherwise attached to airfoil casting portion 102. In some embodiments, where expected service requirements are deemed to allow for its application, columnar-grained material may be used in shroud portion 118.

Single-crystalline region 104 is formed via a casting process designed to produce a significant portion of airfoil casting portion 102 that is made of single-crystal material. In some embodiments, single-crystalline region 104 forms at least 10 percent of the solid cross-sectional area (i.e., the area of metal rather than the entire area bound by the structure) of airfoil casting portion 102, as measured at a midpoint between base 112 and tip 114 of the airfoil 102. In certain embodiments, single-crystalline region 104 forms from about 10 percent to about 90% of this cross section. The single-crystal material of region 104 provides comparatively high creep strength compared to polycrystalline materials such as columnar grained, directionally solidified materials. In some embodiments, the material of single-crystalline region 104 is oriented such that its [001] crystallographic direction is along, that is, substantially parallel to, the axial direction of airfoil casting portion 102. "Substantially parallel" herein means parallel to within +/−12° of the specified direction. In certain embodiments, the material of single-crystalline region 104 is further oriented such that it has a grain orientation of [100] or [010] along a transverse direction of the airfoil casting portion. This orientation advantageously aligns the material's lowest modulus directions along directions of airfoil casting portion 102 that typically experience the highest thermal strains, thereby minimizing thermal stresses developed during turbine transient periods such as start-ups and shut-downs.

Figure 2:
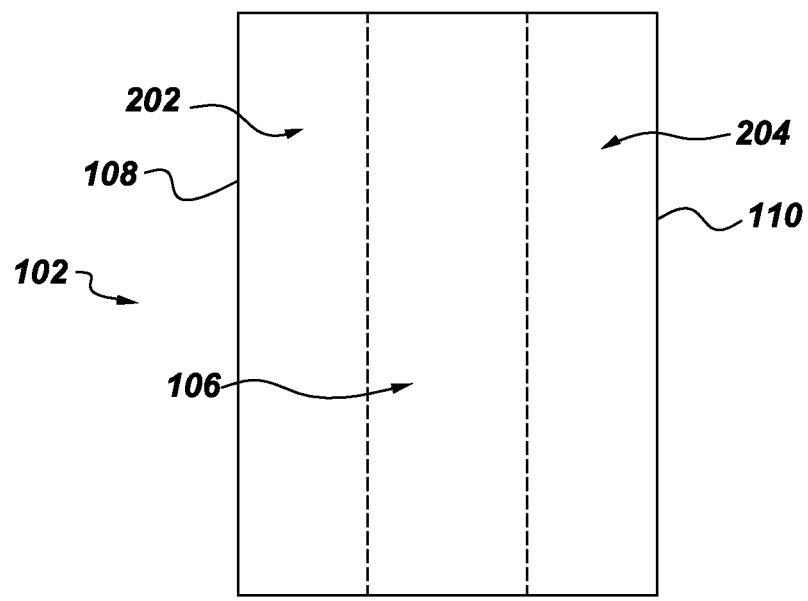
FIG. 2 is a schematic of an airfoil casting portion of an article according to an embodiment of the present invention.

One or more single-crystalline regions 104 may be located anywhere on airfoil casting portion 102. In some embodiments a single-crystalline region 104 is located at a section of airfoil 102 that is expected to endure comparatively severe service conditions, such as, for example, a section of airfoil 102 that is not air-cooled, meaning the section has no proximate air-cooling channel effective to remove significant heat from the section. In one embodiment, trailing edge section 110 comprises single crystalline region 104, which means that single-crystal material is disposed at least at the trailing edge 110 of airfoil casting portion 102. In one embodiment, leading edge section 108 comprises single-crystalline region 104, meaning that single-crystal material is disposed at least at the leading edge 108 of airfoil casting portion 102. In particular embodiments, shown schematically in FIG. 2, airfoil casting portion 102 comprises a first single-crystalline region 202 and a second single-crystalline region 204, where leading edge section 108 comprises the first single-crystalline region 202 and trailing edge section 110 comprises the second single-crystalline region 204. Polycrystalline region 106, such as a columnar-grained region, is interposed between single crystalline regions 202 and 204.

As stated above, in some embodiments airfoil casting portion 102 comprises columnar-grained region 106 integral with single-crystalline region 104. Columnar-grained material, while typically more difficult to fabricate than other polycrystalline-structured materials such as conventional equiaxed material, is somewhat less complex to produce than single crystal material, with high-temperature properties that are intermediate to equiaxed and single-crystal materials. Thus, columnar-grained material, typically produced via a directional solidification process, may be attractive in some instances or component locations where the use of the very highest performing material is not required or economically viable.

In some embodiments, the columnar-grained region 106 is made of material having a plurality of grains oriented with their [001] crystallographic direction along, that is, substantially parallel to, the axial direction of airfoil casting portion 102. As with the single-crystalline region 104, this alignment serves to minimize thermal stresses during transient periods in turbine operating conditions. A so-called "half-height" point of airfoil casting portion 102 is typically defined in the art to be midway between base 112 and tip 114. A cross-section of airfoil 102 taken at this point is the "half-height cross-section," and the number of grains disposed within this half-height cross-section is often used to characterize the grain size of the material. In some embodiments, columnar-grained region 106 comprises at least 5 grains disposed along the half-height cross-section of airfoil casting portion 102, and in particular embodiments, the number of grains so disposed is at least 10. A comparatively high number of grains may be desired in some embodiments to promote isotropic behavior within the material, which may provide an engineering advantage in some applications.

Article 100 described above includes an airfoil casting portion 102 having integral regions 104 and 106 that are made together in a single casting, rather than by separate casting and joining procedures. Embodiments of the present invention include a method for making article 100. In the method, a quantity of molten metal is provided; the metal may be any of the materials described previously herein.

Figure 3:
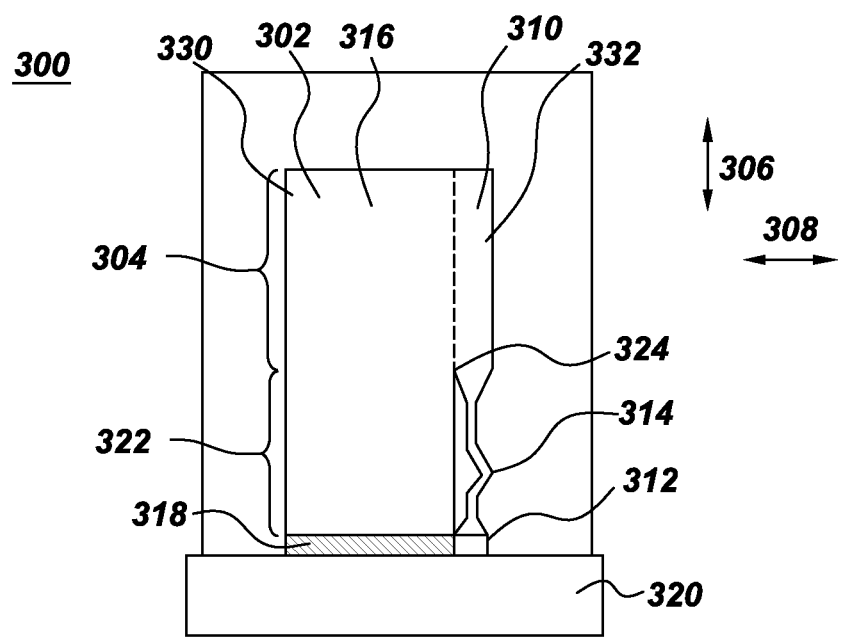
FIG. 3 is a schematic cross-section view of a mold according to an embodiment of the present invention.

As part of the method, a mold is provided. The mold may be provided using a lost wax (investment) process, for example, or other techniques known in the art such as stereolithography. As shown in FIG. 3, the mold 300 defines a cavity 302, a portion of which (the "airfoil portion" 304) is in the shape of airfoil casting portion 102 of article 100. Axial 306 and transverse 308 directions defined for the solid airfoil casting portion 102 also correspond herein with the airfoil portion of the mold.

A single-crystal growth region 310 of cavity 302 is disposed within mold 300. In some embodiments, single-crystal growth region 310 includes one or more of the following: a seed region 312, disposed to hold a seed crystal to aid nucleation and growth of single crystal cast metal in accordance with known practices in the art of single-crystal casting; and a grain selector region 314 disposed to preferentially promote growth of a single crystal having the crystallographic orientation desired for the finished part, again in accordance with known practices in the art.

A columnar growth region 316 is disposed in a transverse direction from single-crystal growth region 310. In some embodiments, columnar growth region 316 includes a starter block region 318, disposed to hold a columnar grain starter block if such a block is to be used to promote nucleation and growth of columnar-grained cast metal in accordance with known practices in the art for directional solidification of columnar materials.

Although not illustrated in FIG. 3, it will be apparent that mold 300 may be disposed to include more than one single-crystal growth region and/or more than one columnar growth region, depending on the desired structure for the finished article 100, as described previously.

Molten metal is introduced into mold 300 via any suitable means known in the art. For example, gravity pouring involves gravity as primary means for filling all desired sections of cavity 302, but other techniques known in the art may be appropriate in some cases, such as, for instance, vacuum casting, tilt casting, pressure casting, and centrifugal casting.

The molten metal is solidified within mold 300 to produce the finished part. Generally, solidification is performed within a directional solidification furnace in accordance with known practices in the art. In some embodiments, a chill plate 320 is used to promote heat extraction from the melt, such as by the Bridgman process, which is well known and used extensively in the art. In some embodiments, heat from the molten metal is transferred via conduction through a liquid metal cooling medium, in a process known in the art as Liquid Metal Cooling (LMC). In some embodiments, to promote nucleation and growth of desired materials in their respective regions, a seed crystal is included in seed region 312, and/or a columnar-grain starter block is included in starter block region 318, prior to introducing the molten metal into mold 300.

Directional solidification of molten metal is performed, with columnar-grained material forming within columnar growth region 316 and single-crystalline material forming within single-crystal growth region 310. Solidification of the material generally occurs directionally such that a solid/liquid interface ("solidification front") progresses axially, that is, substantially parallel to the axial direction 306. It will be appreciated that columnar growth region 316 and single-crystal growth region 310 are disposed such that single-crystalline material and columnar-grained material form simultaneously as the solidification front progresses in the axial direction. In some embodiments, the respective points in mold 300 where solidification is to occur first in columnar growth region 316 and single-crystal growth region 310 lie along a line that is substantially perpendicular to the axial direction 306 to allow molten metal in each region to solidify at substantially the same rate, meaning that the solidification front for each region resides at substantially the same point along the axial direction at any given time. In one embodiment, solidification progresses in this way to form an airfoil, or at least an airfoil casting portion 102 of a larger article 100, comprising at least one single-crystalline region 104 and at least one columnar-grained region 106.

In certain embodiments, mold 300 further comprises a preliminary solidification region 322 wherein single-crystal growth region 310 and columnar growth region 316 are separated from one another, and a junction region 324 where single-crystal growth region 310 and columnar growth region 316 join together and become integral. In such embodiments, the solidification step further involves controlling the solidification front within junction region 324 to be substantially parallel to the axial direction, to ensure that solidification occurs at the same rate in regions 310 and 316. The rate at which the solidification front moves is controlled in part by the temperature of the furnace and the rate at which the mold is exposed to coolant, such as liquid metal coolant, the temperature distribution within the coolant, the uniformity of mold geometry, the materials used to construct the mold, and other aspects that control heat transfer from the molten metal out through the mold.

As discussed previously, the crystallographic orientation of material in the airfoil casting 102 may be controlled to mitigate thermal stresses during service. Thus, in some embodiments, the solidifying step includes controlling grain orientation of solidified metal to be [001] along axial direction 306 of airfoil portion 304 in columnar growth region 316, single-crystal growth region 310, or both of these regions. Grain orientation control techniques known in the art of directional solidification are generally suitable for application in the method described herein. Grain orientation is typically controlled within directionally solidified materials, such as single-crystalline and columnar-grained materials, by selection and application of properly oriented seed crystals or starter blocks, by incorporation of selector region 314, and/or by controlling cooling rate through one or more of the factors described above for controlling heat transfer out of the molten metal.

Airfoil portion 304 of cavity 302, in some embodiments, comprises a leading edge section 330 and trailing edge section 332 that corresponds to leading edge section 108 and trailing edge section 110 of airfoil casting portion 102. In some embodiments, the solidifying step includes solidifying single-crystalline material within one or both sections 330, 332 of cavity 302. In some embodiments, the molten metal is solidified so that airfoil casting portion 102 has a single-crystalline region 104 that forms at least 10 percent of cross-sectional area of airfoil casting portion as measured at a midpoint between base 112 and tip 114 of the airfoil 102, as described previously. Mold 300 may be shaped accordingly so that single-crystal growth region 310 coincides with the desired section of cavity 302 where single-crystalline material is to be disposed; columnar growth region 316 may be similarly disposed to coincide with any desired section of cavity 302 where columnar-grained material is desired to be disposed. Similarly, other sections of cavity 302 may be included in some embodiments to produce a cast article 100 having any of the additional portions described previously, including, as examples, platform portion 116, and shroud portion 118. Using the techniques described herein, molten metal may be solidified within these additional sections of cavity 302. In some embodiments, polycrystalline material, such as columnar-grained material, is solidified in one or more sections of cavity 302 corresponding to platform portion 116 and shroud portion 118.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article, comprising:
   an airfoil casting portion comprising:
      a plurality of integral regions comprising a single-crystalline region and a columnar-grained region;
      a leading edge section comprising a leading edge of the airfoil casting portion; and
      a trailing edge section comprising a trailing edge of the airfoil casting portion, wherein
         the single-crystalline region comprises a single-crystalline material; and
         the single-crystalline material is disposed at least at the leading edge of the airfoil casting portion or at the trailing edge of the airfoil casting portion.

2. The article of claim 1, wherein the single-crystalline region forms at least 10 percent of a solid cross-sectional area of airfoil casting portion, as measured at a midpoint between a base and a tip of the airfoil.

3. The article of claim 1, wherein the single-crystalline region has a grain orientation of [001] along an axial direction of the airfoil casting portion.

4. The article of claim 3, wherein the single-crystalline region has a grain orientation of [100] or [010] along a transverse direction of the airfoil casting portion.

5. The article of claim 1, wherein the airfoil casting portion comprises
   a leading edge section and a trailing edge section, and
   a first single-crystalline region and a second single-crystalline region,
   wherein the leading edge section comprises the first single-crystalline region and the trailing edge section comprises the second single-crystalline region, wherein the columnar-grained region is interposed between the first and second single-crystalline regions.

6. The article of claim 1, further comprising a platform portion adjoining a base section of the airfoil casting portion.

7. The article of claim 6, wherein the platform portion comprises columnar-grained material.

8. The article of claim 6, wherein the platform portion is integral with the airfoil casting portion.

9. The article of claim 1, further comprising a shroud portion attached to the airfoil casting portion at a tip section of the airfoil casting portion.

10. The article of claim 9, wherein the shroud portion comprises columnar-grained material.

11. The article of claim 10, wherein the shroud portion is integral with the airfoil casting portion.

12. The article of claim 1, wherein the columnar-grained region comprises material having a plurality of grains having a grain orientation of [001] along an axial direction of the airfoil casting portion.

13. The article of claim 1, wherein the columnar-grained region comprises at least 5 grains disposed along a half-height cross-section of the airfoil casting portion.

14. The article of claim 1, wherein the columnar-grained region comprises at least 10 grains disposed along a half-height cross-section of the airfoil casting portion.

15. The article of claim 1, wherein the airfoil casting portion comprises a nickel alloy, a cobalt alloy, or a nickel-iron alloy.

16. An article comprising:
   an airfoil casting portion comprising a base section, a tip section opposite the base section in an axial direction along the airfoil casting portion, a leading edge section comprising a leading edge of the airfoil casting portion, and a trailing edge section comprising a trailing edge of the airfoil casting portion, opposite the leading edge section in a transverse direction along the airfoil casting portion;
   a shroud portion comprising columnar-grained material, the shroud portion disposed at the tip section and integral with the airfoil casting portion; and
   a platform portion comprising columnar-grained material, the platform section disposed at the base section and integral with the airfoil casting portion;
   wherein the airfoil casting portion further comprises a single-crystalline region comprising a single-crystalline material; and a columnar-grained region,
   the single-crystalline material is disposed at the leading edge of the airfoil casting portion, or at the trailing edge of the airfoil casting portion, or at both the leading edge and the trailing edge of the airfoil casting portion, and
   at least 10 percent of a solid cross-sectional area of airfoil casting portion, as measured at a midpoint between a base and a tip of the airfoil, comprises the single-crystalline material.

17. A method for fabricating an article, the method comprising:
  providing a quantity of molten metal;
  providing a mold defining an airfoil portion having an axial direction; a transverse direction; a leading edge section; and a trailing edge section,
  wherein the airfoil portion of the mold comprises a single-crystal growth region and a columnar growth region disposed along the transverse direction from the single crystal growth region;
  introducing the molten metal into the mold; and
  solidifying the metal such that a solidification front progresses in the axial direction to produce an airfoil casting portion comprising
    a single-crystalline region comprising a single-crystalline material; and
    a columnar-grained region, wherein
  the single-crystalline material is disposed at least at a leading edge of the airfoil casting portion, at a trailing edge of the airfoil casting portion, or both the leading edge and trailing edge of the airfoil casting portion.

18. The method of claim 17, wherein the mold further comprises a preliminary solidification region wherein the single-crystal region and the columnar growth region are separated from one another, and a junction region wherein the single-crystal region and the columnar growth region are integral; wherein solidifying further comprises controlling the solidification front within the junction region to be substantially perpendicular to the axial direction.

19. The method of claim 17, wherein solidifying comprises controlling grain orientation of solidified metal to be [001] along the axial direction within the single-crystal growth region, the columnar growth region, or both of these regions.

20. The method of claim 17, wherein solidifying further comprises solidifying the metal to produce an airfoil casting portion having a single-crystalline region that forms at least 10 percent of a solid cross-sectional area of airfoil casting portion, as measured at a midpoint between a base and a tip of the airfoil.

21. The method of claim 17, wherein the provided mold further defines a platform portion disposed at a base section of the airfoil portion, a shroud portion disposed at a tip section of the airfoil portion, or both the platform portion and the shroud portion, and wherein solidifying further comprises solidifying columnar-grained material within the platform portion, the shroud portion, or within both of these portions.

22. The method of claim 17, wherein solidifying comprises transferring heat from the molten metal via conduction through a liquid metal cooling medium.

* * * * *